Jan. 9, 1962 H. A. WOLTER ETAL 3,015,924
CLOTHESPIN COUNTING AND ASSEMBLING MACHINE
Filed Jan. 30, 1959 6 Sheets-Sheet 1

INVENTORS
Harry A. Wolter
Gerald L. Vaughan

BY Karl W. Flocks
ATTORNEY

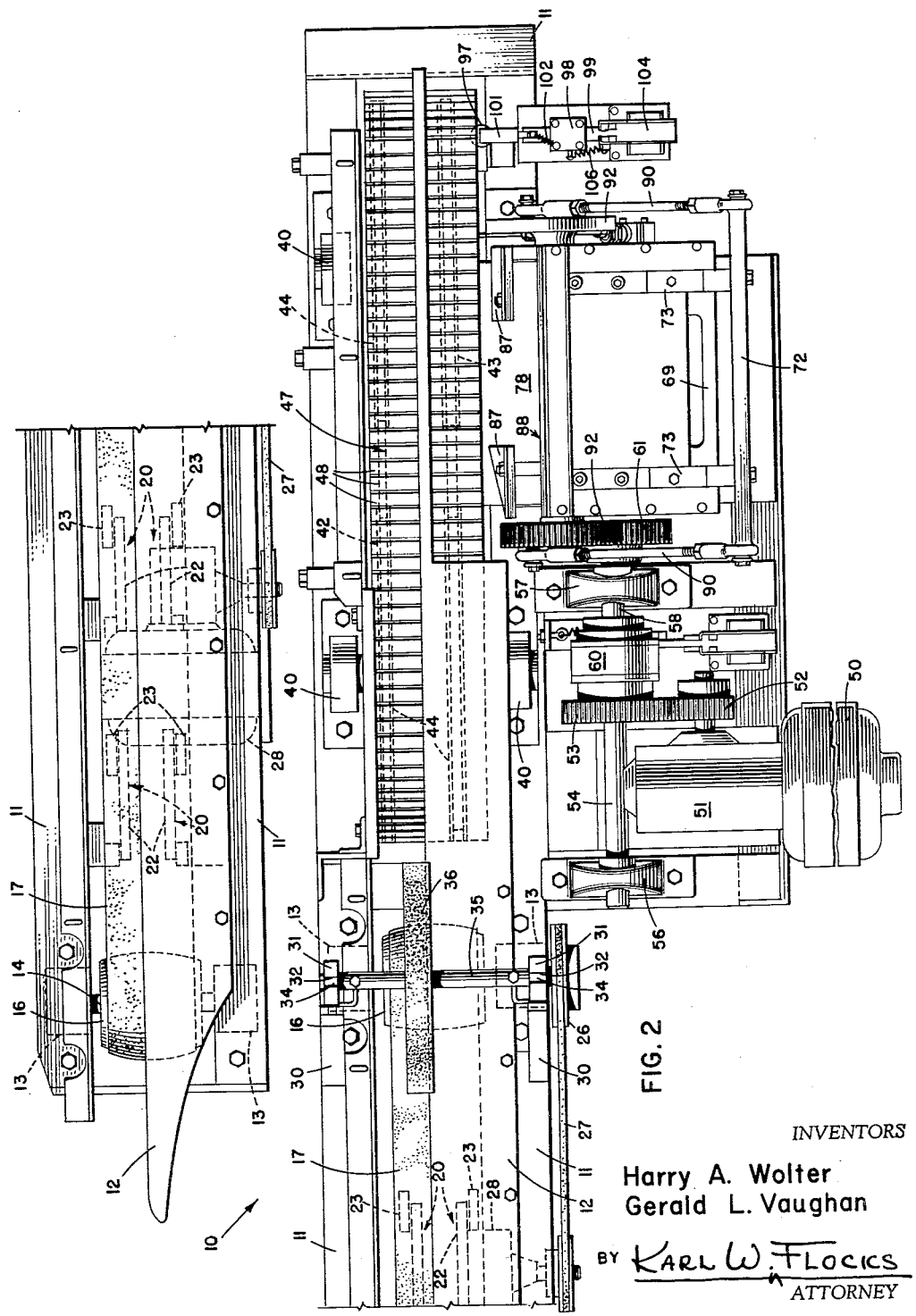

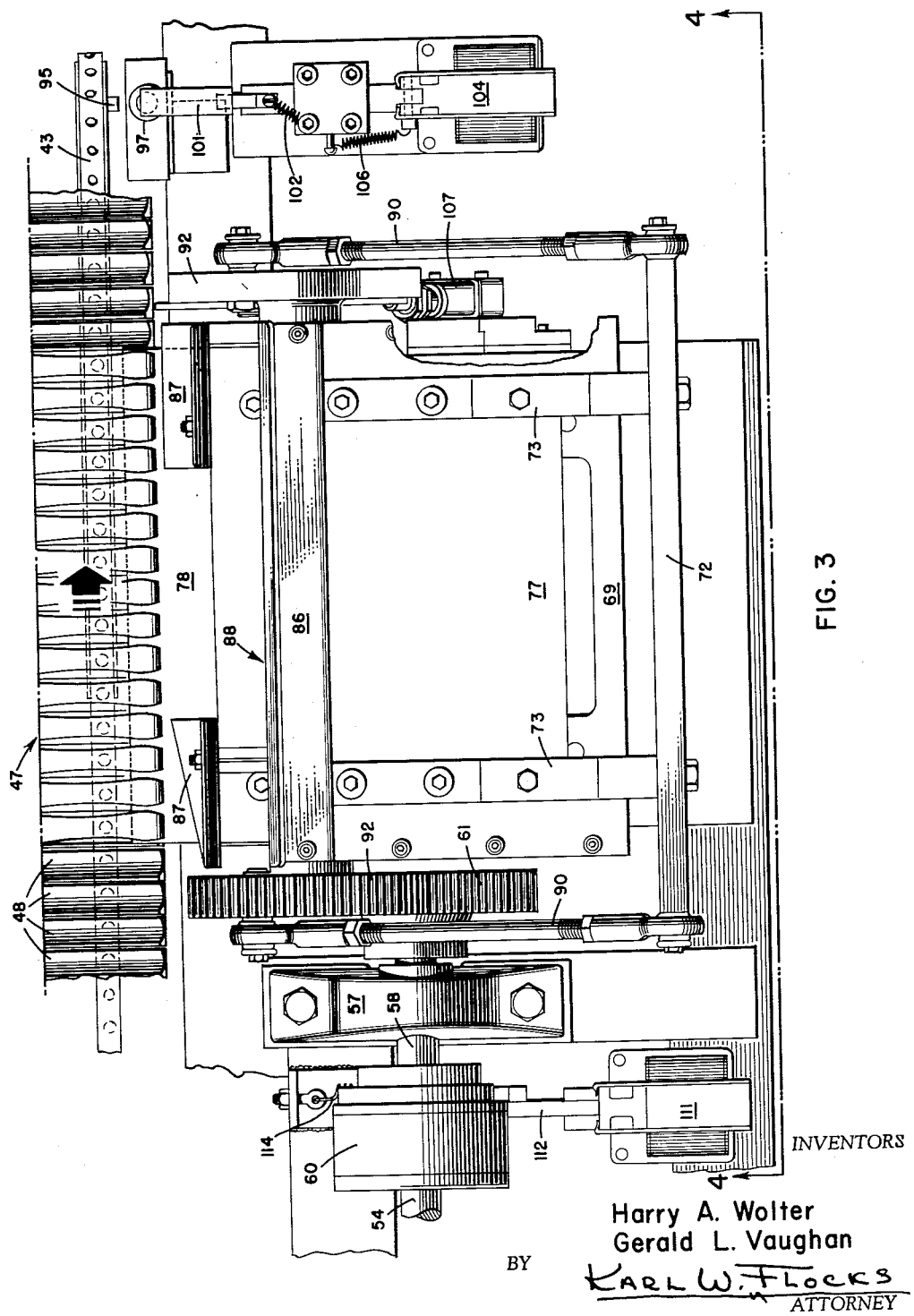

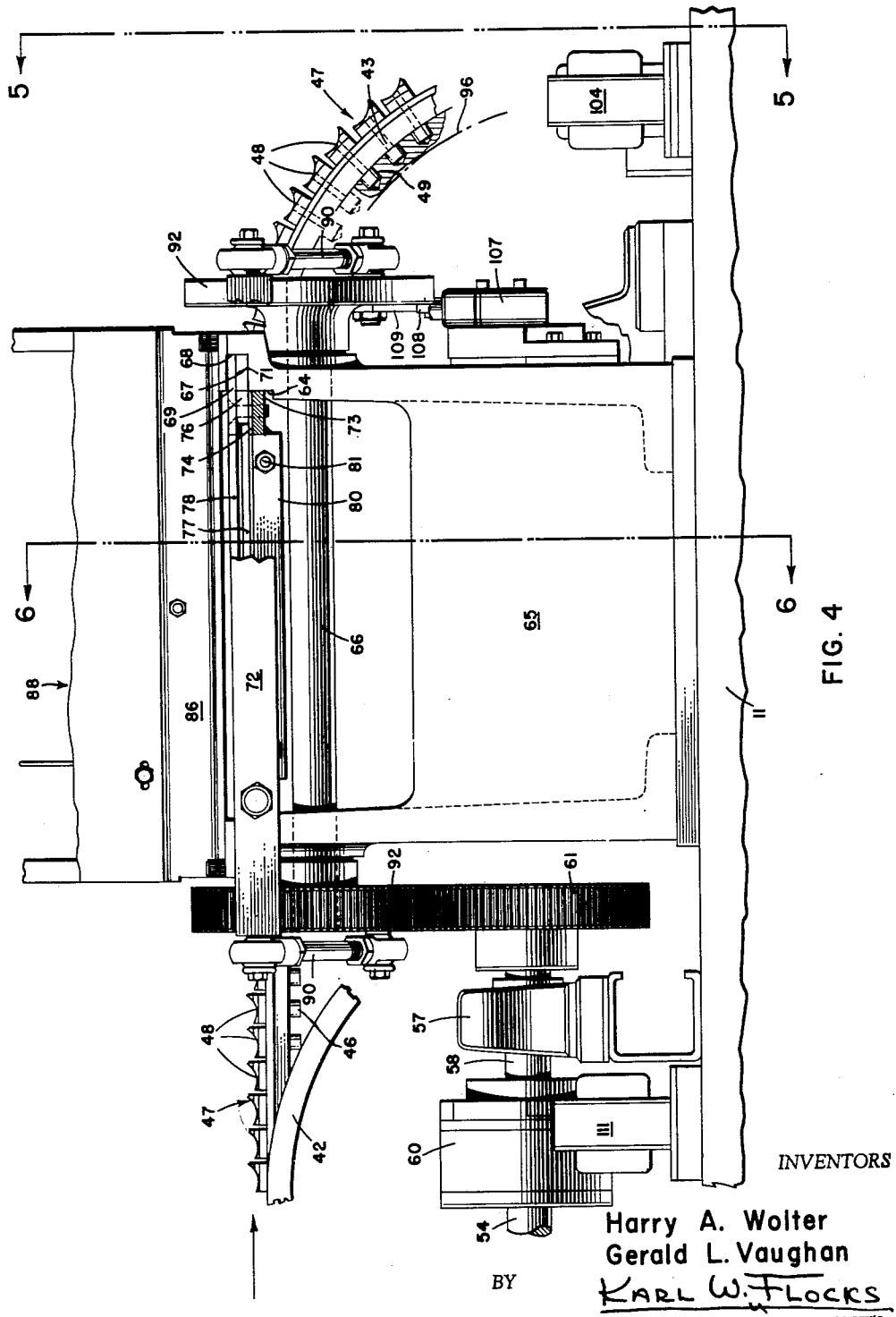

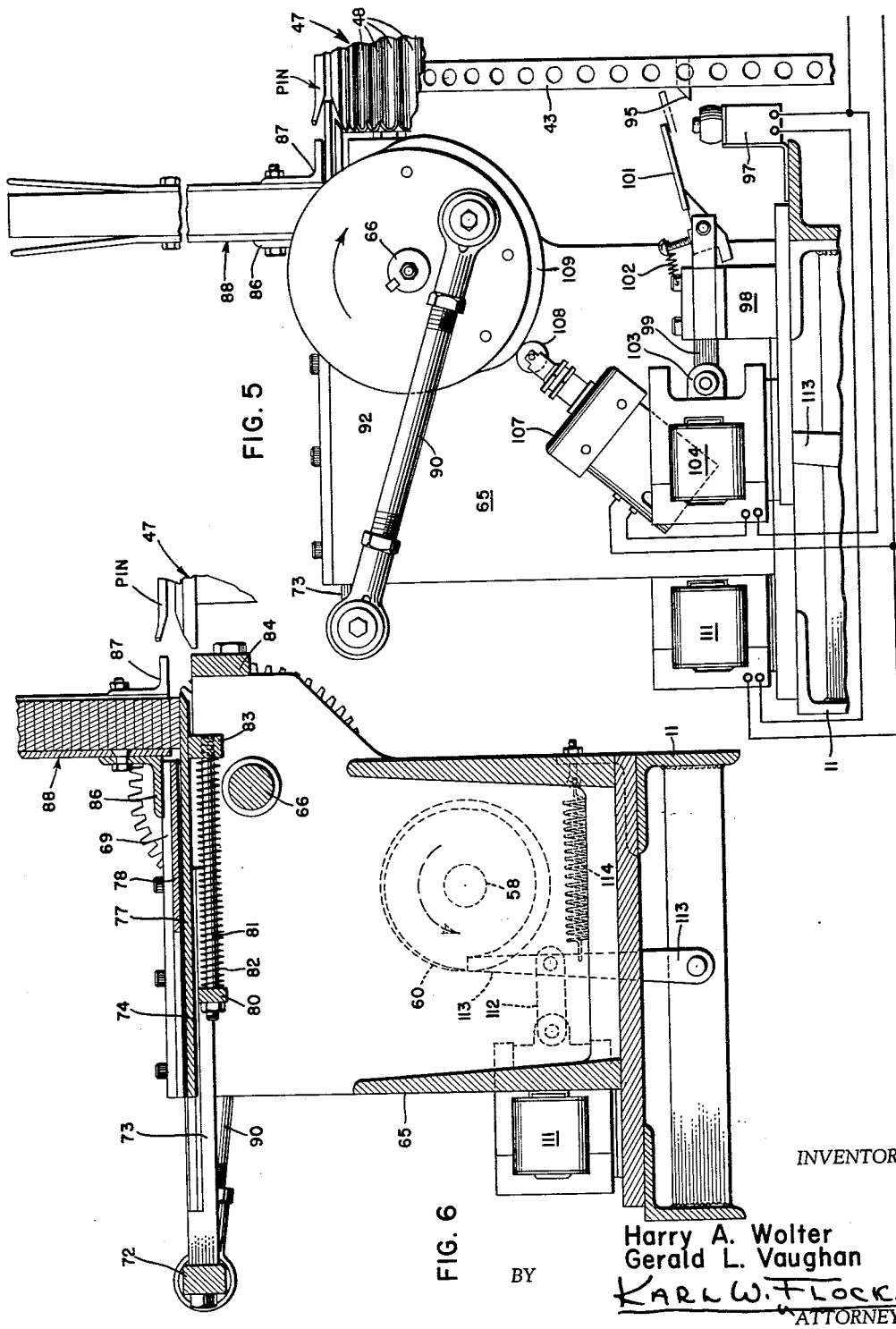

INVENTORS
Harry A. Wolter
Gerald L. Vaughan

United States Patent Office 3,015,924
Patented Jan. 9, 1962

3,015,924
CLOTHESPIN COUNTING AND ASSEMBLING MACHINE
Harry A. Wolfer, Akron, Ohio, and Gerald L. Vaughan, Rumford, Maine, assignors to Diamond National Corporation, a corporation of Delaware
Filed Jan. 30, 1959, Ser. No. 790,175
49 Claims. (Cl. 53—197)

The present invention relates to a machine for counting and assembling clothespins, and more particularly to a machine for counting a predetermined number of kerf-type clothespins and assembling them onto an assembly element, such as a stick.

In the manufacture and packaging of kerf-type clothespins, the clothespins are produced, then sorted and oriented and are thereafter packaged. A method and apparatus for sorting and orienting kerf-type clothespins is set forth in Patent No. 2,843,254 to Gerald L. Vaughan, issued July 15, 1958. As a result of the actions of the apparatus disclosed in that patent, clothespins which are received on a conveyor in random disposition as to the orientation of their heads and as to the orientation of their kerfs are sorted and oriented so that all of the kerfs lie in a substantially horizontal plane. Those of the clothespins having their heads on one side of the conveyor are then fed onto a collector member, and those clothespins having their heads on the other side of the conveyor are fed onto a second collector member. These collector members are in the shape of thin, elongate strips, onto which the kerfs of the clothespins are slid.

Following the sorting and orienting operation, it is desirable to assemble a selected and predetermined number of the clothespins onto an assembly element, such as a card or a stick, and it is to this end that the present invention is directed.

An object of the present invention is to provide a method of and apparatus for assembling a plurality of kerf-type clothespins on an assembly element.

Another object of the present invention is the provision of a machine for assembling a predetermined number of kerf-type clothespins on an assembly element in an entirely automatic operation.

A still further object of the present invention is to provide a machine for assembling a plurality of clothespins on an assembly element that is economical and positive in operation.

Other objects and the nature and advantages of the instant invention will be apparent from the following description taken in conjunction with the accompanying drawings, wherein:

FIG. 2 is a plan view of the machine shown in FIG. 1.

FIG. 3 is a plan view, with parts removed, of a part of the machine shown in FIGS. 1 and 2 to an enlarged scale.

FIG. 4 is an elevational view taken on the line 4—4 of FIG. 3.

FIG. 5 is an end elevation, with parts in sections, taken on the line 5—5 of FIG. 4.

FIG. 6 is a cross-sectional view taken on the line 6—6 of FIG. 4.

Figure 1:
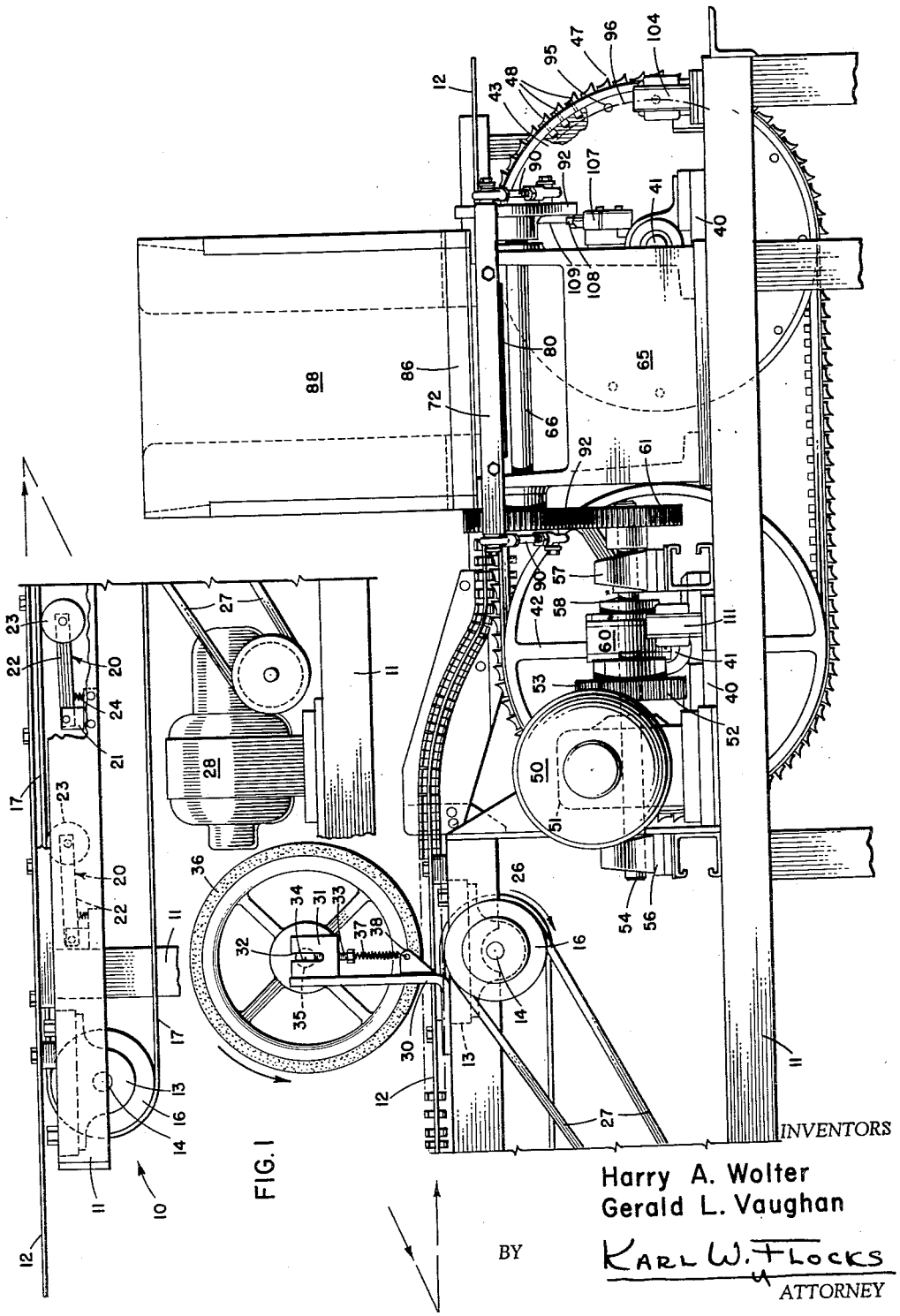
FIG. 1 is an elevational view, with parts removed, of a machine in accordance with the present invention.

Referring now to the drawings, wherein like reference numerals are used to designate like or corresponding parts throughout the several views, there is shown in FIG. 1 a clothespin mounting and assembling machine 10 comprising a frame, generally designated 11. The frame 11 supports a guide 12, which is a generally flat, elongate member along which the kerf-type clothespin may travel, with the guide 12 in the kerf thereof. The guide 12 may be a continuation of one of the members 58 or 60 shown in FIG. 1 of the aforementioned Vaughan Patent No. 2,843,254. As may be seen in FIG. 2, the guide 12 is relatively narrow where it overhangs the left-hand end of the machine 10, but widens quickly upon entrance over the machine 10.

The frame 11 supports four spaced bearings 13, and these bearings 13 in turn support two shafts 14 on which are mounted a pair of pulleys 16. Over the pulleys 16 there is trained an endless belt 17, the upper run of which lies in a plane that is below the bottom edge of the guide 12 by an amount approximating the radius of a kerf-type clothespin, being in practice slightly less than this radius. To maintain the upper run of belt 17 substantially planar, there are provided one or more devices 20, there being four such devices on the machine 10. A typical one of the devices 20 is shown in FIG. 1 to comprise a support block 21 on which is pivoted an arm 22 having a small wheel 23 at one end thereof. A spring 24 acts against the arm 22 to urge the wheel 23 upwardly against the lower side of the upper run of belt 17.

The right-hand one of the pulleys 16 has the shaft 14 thereof extending beyond the edge of the frame 11, the shaft 14 having a pulley 26 thereon. Pulley 26 is caused to rotate by an endless power transmitting member 27, which in turn receives its power from a motor 28.

On the frame 11, and near the head pulley 16, there is mounted a pair of angle irons 30, the upstanding legs of which have support blocks 31 secured thereto. Each support block 31 has a vertically extending slot 32 therein, and a bolt 33 that is threaded upwardly through the bottom of the block 31 and enters into the lower part of the slot 32. Slot 32 receives the flattened end 34 of a shaft 35 having a large rubber-faced idler roller 36 thereon. A hold-down spring 37 has one end engaged about the shaft 35, and the other end secured to an angle bracket 38 that is mounted on the angle iron 30. By adjustment of the bolt 33 the height of the bottom periphery of rubber-faced idler 36 above the guide 12 may be adjusted.

On the frame 11 to the right of endless belt 17 and idler roller 36 there are mounted four bearing blocks 40, two of which may be seen in FIG. 1. These blocks 40 support transversely extending shafts 41 on which are mounted a pair of pulleys 42 and 43. Each of the pulleys 42 and 43 comprises a pair of axially spaced wheel-like members 44 which are separated by spacer members. These pulleys 42 and 43 support a belt 47 that is made up of a plurality of pocket-forming parts 48. The inner side of belt 47 has pins 46 extending therefrom and entering into holes 49 in the periphery of pulley 43 to thus establish a driving relation between pulley 43 and belt 47. The conveyor comprising the pulleys 42 and 43 and the belt 47 is a free wheeling conveyor, and it will be understood that the pockets of the parts 48 are sized and shaped to receive kerf-type clothespins. As may be seen in FIG. 1, the guide 12 curves downwardly a short distance to the right of idler roller 36, and then is reversely curved downwardly to a lower level, and finally has an extending part that overlies the upper run of conveyor 47. The upper run of conveyor 47 is slightly below this extending part of the guide 12.

A motor 50 is attached to the frame 11, and drives, through a gear box 51, a pinion 52 which is in mesh with a gear 53 that is supported on a shaft 54. One end of shaft 54 is journaled in a bearing 56, and a second bearing 57 receives the continuation 58 of the shaft 54. Shaft 54 has mounted thereon to the right of the gear 53 a clutch 60, which will be described in more detail later. The continuation shaft 58 is also in engagement with the clutch 60.

Referring now to FIGS. 3 to 6, it may be seen that the shaft 58 has a gear 61 secured to the end thereof. Gear 61, as will be explained hereinafter, drives a stripper mechanism for removing an assembly element from a hopper and inserting the element in the kerfs of clothes- pins supported by the upper run of conveyor 47 and the extension of guide 12. The frame 11 carries an upstanding base 65, this base in turn having a stripper shaft 66 journaled therein. At the upper part of base 65, there may be seen a vertical guide surface 64, a horizontal guide surface 67 adjacent thereto and a second vertical guide surface 68 extending upwardly from the surface 67. A plate 69 overhangs the horizontal guide surface 67. It will be noted that the guide surface 67 forms the upper surface of a plate 71 that is secured on the base 65.

A cross arm 72 may be seen from FIG. 3 to have two pusher members 73 extending therefrom, and as may be seen in FIG. 4, the pusher member 73 has a spacer plate 74 secured thereon. Above the spacer plate 74 is a guide plate 76 having an overhanging shoulder as shown. The lower surface of the overhanging shoulder of the guide plate 76 and the upper surface of spacer plate 74 that underlies the overhanging shoulder are both finished so as to slidingly receive a support plate 77.

A feed plate 78 is of generally U-shape, and has a pair of arms, one of which is shown in FIG. 4 immediately above the guide plate 76. The feed plate 78, the guide plate 76, the spacer plate 74 and pusher member 73 are all secured together, as by a plurality of screws. Feed plate 78 has the arm thereof extending between the overhanging plate 69 and the plate 71 therebelow, and as will be understood slides relatively to them.

A depending bar 80 is secured between the two pusher members 73, as by welding, and a pair of guide rods 81 are slidably received in apertures therein and extend forwardly therefrom, or to the right as seen in FIG. 6. A spring 82 surrounds the guide rod 81, and abuts against the bar 80. The other end of the spring 82 abuts against a bar 83 that is secured to support plate 77, depending therefrom as is shown in FIG. 6. The bar 83 has a pair of threaded holes therein that receive threaded ends of the guide rods 81. A stop 84 may be seen to the right of bar 83 in FIG. 6. The pusher member 73 has a shoulder opposite to and spaced from the rear edge of support plate 77, and there is thus provided a lost motion connection between these parts.

Mounted on the plate 69, and extending across the feeding mechanism, is an angle iron 86 that serves to support, together with the oppositely facing angle iron 87, a magazine 88 for holding the assembly elements. The assembly elements, (not shown) may be made of wood or cardboard, and are in the shape of flat, rectangular sticks.

The cross arm 72 has the ends thereof journaled in a pair of pitmans 90, each pitman having the other end thereof journaled on a pin 91 extending from a disc 92. One of the discs 92 has gear teeth on the periphery thereof, and these teeth are in mesh with the gear 61. Hence, rotation of shaft 58 will cause the gear 61 to drive the toothed disc 92 which in turn will reciprocate the cross arm 72 through the intermediary of the pitmans 90.

To control the counting of the clothespins, the pulley 43 of the free wheeling conveyor is provided with a number of peripherally equally spaced holes, a number of which may be seen in FIG. 1. There are preferably at least two sets of these holes, one set comprising five equally spaced holes and the other set comprising four equally spaced holes. If it is desired to assemble fifteen clothespins, for example, onto a single assembly element, pins will be placed in each of the holes in the set having four holes. Similarly, if it is desired to assemble twelve clothespins onto an assembly element, pins are placed in each hole of a group of holes having five holes. A single pin is shown extending axially of the wheel 43 in FIG. 5, this pin being designated 95. The other pins have been omitted for purposes of clarity. The locus of the free ends of the pins is indicated by the line 96 in FIG. 4. A microswitch 97 is mounted on the frame 11, to one side of the lines 96. A guide block 98 is also secured to the frame 11, and a support 99 is slidable in the guide block 98. One end of support 99 has a lever 101 pivoted thereto. A spring 102 is connected to the lever 101 and to the guide block 98, and urges lever 101 into the position shown in FIG. 5. The other end of support 99 is connected to the armature 103 of a solenoid 104. A spring 106 (see FIG. 3) is connected with a pin that connects armature 104 and the support 99, this spring 106 also being connected to the guide block 98. Thus, it may be seen that spring 106 urges support 99 and lever 101 to the right, as seen in FIG. 5, and thus it may be seen that the free end of lever 101 overlies the microswitch 97, and is in the locus of the pins 95 when subjected only to the urging of spring 106. This position is shown in dotted lines in FIG. 5, and is the forward position of the lever 101. The rearward position of lever 101 is shown in full lines in FIG. 5, and this position is that which occurs when the solenoid 104 is energized.

Solenoid 104 is energized when a circuit is completed during the closing of switch 107, that may be seen to have a follower member 108 that is in engagement with a cam 109 secured to the disc 92 opposite the disc 92 having the toothed surface.

A second solenoid 111 may be seen in FIG. 3 to be in general alignment with the clutch 60. The solenoid 111 is pivotally connected with a lever 113 that is connected at its lower end to the frame 11. Lever 113 functions as a stop-lever for the clutch 60, and may be seen to be in engagement with a shoulder on the driven part of clutch 60 in FIG. 6. A spring 114 is in engagement with the frame 11 and stop lever 113, to urge stop lever to the right as seen in FIG. 6. Solenoid 111 is in series with microswitch 97, as may be seen from the showing of the wiring in FIG. 5; similarly, solenoid 104 is in series with the switch 107, as is also seen from FIG. 5.

In operation, kerf-type clothespins are moved along the left part of guide 12 at random intervals of time, and at random spacing. Once a clothespin is above the upper run of belt 17, it will be engaged thereby and moved along the guide 12 until it comes under the rubber-faced idler roller 36. Since the lowermost part of idler roller 36 is slightly below the upper surface of the clothespins on the guide 12, and since the rubber-face of the roller 36 is resilient, the clothespins will be caught between the roller 36 and the head pulley 16, and will be forcefully urged along the guide 12 to the right. As succeeding clothespins arrive on and are moved along the guide 12, each succeeding clothespin will be pushed to the right forcefully by the action of the head pulley 16 and idler roller 36, and each succeeding clothespin in turn will urge the other clothespins to the right. Eventually, a solid line of contiguous clothespins will occupy the guide 12 along its curved portions, and extending between the lower extension level thereof and the idler roller 36. Thereafter, upon the arrival of another clothespin at the idler roller 36, it will be pushed to the right and will in turn push all of the other clothespins to the right. The first clothespin will then enter into one of the compartments 48 of the conveyor 47, and the conveyor 47 will be pushed so that its upper run moves to the right, as seen in FIG. 1. The conveyor 47 will only move one step, i.e., the distance of one part 48.

The step by step motion of the conveyor 47 will be continued under the command of the belt 17 and idler roller 36 until a predetermined number of clothespins have been fed across in front of the stripping and feeding mechanism. This number is predetermined by the number of pins 95 that have been inserted into the head pulley 43. As the free or unpowered conveyor 47 moves, one of the pins 95 will come into contact with the upper surface of lever 101 (see FIG. 5) and will rotate the lever 101 on its support 99 until the lever 101 engages with the movable member of microswitch 97. When this occurs, the microswitch 97, lever 101 and pin 95 will serve as a stop for the conveyor 47. Also, engagement of lever 101 with microswitch 97 will close a circuit in which is the solenoid 111, as may be seen from FIG. 5, and this will cause the solenoid 111 to move the stop-lever 113 to the left, and out of engagement with the driven part of clutch 60. Since motor 50 is continuously rotating, the shaft 58 will be driven, and will in turn rotate gear 61 and the toothed disc 92 to thereby effect movement of the stripper and feeding mechanism. As the disc 92 rotates, the cam 109 will engage the follower 108 of switch 107 to thereby energize the solenoid 104 to move the support 99 to its rear position. This will free lever 101 from engagement by the pin 95, and it will rotate upwardly and away from the microswitch 97 under the urging of spring 102. This will open microswitch 97, to thus deenergize solenoid 111, and the spring 114 will return the stop-lever 113 to the right. Thus, as the shoulder of the driven part of clutch 60 completes one revolution, it will again strike the upper end of lever 113 and will be stopped thereby.

Referring now to FIG. 6, as the cross arm 72 moves forward in response to movement of the pitmans 90, the two pusher members 73 will also move forward and carry the bar 80 with them. The bar 80 will urge the spring 82 forward and it in turn will urge bar 83 and support plate 77 forward. It will be observed from FIG. 6 that support plate 77 has the forward end thereof underlying the stack of assembly elements in the magazine 88. The forward edge of feed plate 78 is just to the rear of magazine 88, and is of the thickness of one assembly element. Thus, as cross arm 72 moves forward the feed plate 78 and support plate 77 will also move forward, due to the spring 82. As the forward movement continues, the bar 83 will strike the stop 84, and the forward progress of support plate 77 will be stopped. The forward position of support plate 77 is shown in FIG. 5. Once the support plate 77 has stopped, the discs 92 will continue to drive the cross arm 72 forward, and due to the positive connection between feed plate 78 and pusher member 73, the feed plate 78 will continue its forward motion, and will move relatively to the now halted support plate 77 to feed the assembly element into the kerfs of the aligned clothespins. Further rotation of the discs 92 will withdraw the feed plate 78, and after it has moved rearwardly a certain distance, the face of bar 80 engages with the nuts on rods 81 to retract bar 83 and the support plate 77. It will be understood that the stop 84 is not coextensive in length with the bar 83, and does not extend in front of the guide rods 81.

Figure 7:
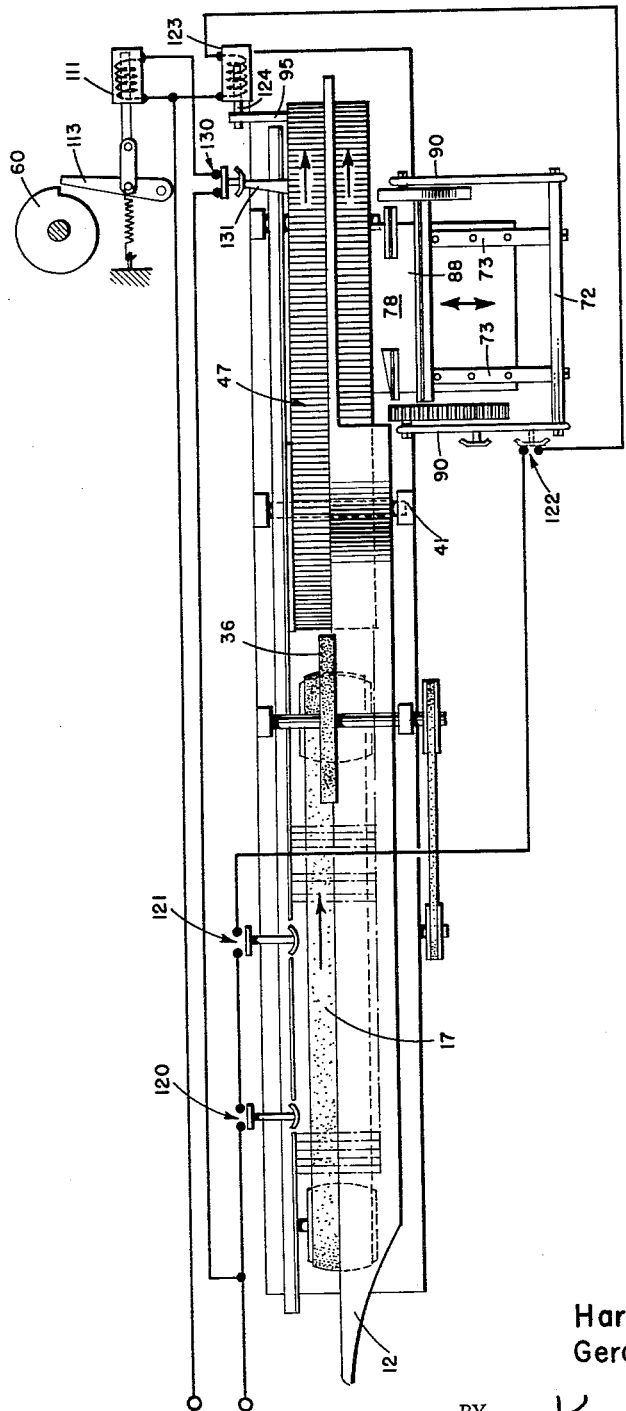
FIG. 7 is a schematic plan view of another embodiment of the invention.

In FIG. 7 there is shown a second embodiment of the invention. This is a plan view, generally schematic, and there may be seen therein the guide 12 overlying the belt 17, and the rubber-faced idler roller 36. There may also be seen the free wheeling conveyor 47 and the stripping and feeding mechanism comprising the cross arm 72 and the pitmans 90, as well as the pusher members 73 and the feed plate 78. The clutch 60 may also be seen, controlled by the stop lever 113 that is connected with a solenoid 111.

Above the guide 12 are a pair of microswitches 120 and 121, these microswitches being positioned to be contacted by clothespins on the guide 12. These switches are closed only when two clothespins underlie each of them. A microswitch 122 is positioned on the base, and is closed by the movable parts of the stripping and feeding mechanism, as for example the pusher member 73. The three microswitches 120, 121, and 122 are in series with a solenoid 123 having an armature 124 that normally extends into position to be engaged by a pin 95.

A microswitch 130 is in series with the solenoid 111, and is closed by a finger 131 that is also mounted on the head pulley of conveyor 47.

The armature 124 of solenoid 123 is normally in the position shown, and acts as a stop for a pin 95, thus preventing movement of conveyor 47 when the solenoid 123 is not energized. As clothespins are fed onto the guide 12, as each pin moves along the guide due to the action of the belt 17, the microswitches 120 and 121 will be momentarily closed, and as the stripping and feeding mechanism is in the withdrawn position the switch 122 will also be closed. However, these switches 120 and 121 are only closed if each is engaged by two clothespins, as noted above, so that the circuit through these switches will not be completed until a continuous line of clothespins extends from the idler roller 36 back to at least the switch 121. If it is desired to feed, for example, fifteen clothespins at a time, then the switch 121 is so positioned that it will be closed by the fourteenth and fifteenth clothespins, counting backwards from the nip of the idler roller 36. With the parts thus positioned, it is only when fifteen clothespins are aligned between roller 36 and switch 121, and two clothespins engage the switch 120 that solenoid 123 will be energized. Usually, this will require that the line of clothespins extend unbrokenly all the way back from idler roller 36 to switch 120.

Upon energization of solenoid 123, armature 124 thereof will be withdrawn from locking position, where it is in engagement with the pin 95, and the free wheeling conveyor 47 may then be moved by the belt 17 acting through the intermediary of the clothespins on the guide 12. As the free wheeling conveyor 47 moves, the pin 131 extending from the head pulley thereof will engage with the switch 130, to close it and energize solenoid 111, thus permitting the clutch 60 to drive the feeding and stripping mechanism. This will cause, as before, an assembly element to be removed from the magazine 88 and inserted in the kerfs of the selected number of clothespins, fifteen in the example given. Movement of the feeding and sripping mechanism will open the switch 122, to thereby deenergize solenoid 123 and to thereby return the armature 124 into position for engagement by the next pin 95. Also, the switch 130 will have been opened due to the passage of the contact 131 and the stop-lever 113 will have been returned to its position to engage the clutch 60 after one revolution thereof.

There has been provided method and apparatus for counting a predetermined number of kerf-type clothespins, or similar articles, and for assembling the clothespins onto an assembly element. The apparatus described that embody the invention are simple in construction and relatively foolproof in operation, thereby being both economical to produce and without difficulty to maintain.

It will be obvious to those skilled in the art that various changes may be made without departing from the spirit of the invention and therefore the invention is not limited to what is shown in the drawings and described in the specification but only as indicated in the appended claims.

What is claimed is:

1. A machine for assembling a plurality of kerf-type clothespins on an assembly element comprising an elongate guide, an endless belt trained over spaced pulleys, the upper run of said belt lying in a plane slightly below said guide, belt tensioning means engaging the upper run of said belt for maintaining said upper run substantially planar, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, a stop-lever engageable with said clutch for preventing movement of the driven part thereof, a second solenoid for moving said stop-lever out of engagement with the driven part of the clutch, circuit means connecting said microswitch and said second solenoid to release said clutch upon closing of said microswitch by a pin engaging said end of said lever, a cam operatively connected with said feed plate, a second microswitch closed by movement of said cam, and circuit means connecting said second microswitch and said first solenoid to thereby retract said support upon closing of said second microswitch by said cam.

2. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, means for controlling said clutch comprising a second solenoid and circuit means connecting said microswitch and said second solenoid to release said clutch upon closing of said microswitch by a pin engaging said end of said lever, a cam operatively connected with said feed plate, a second microswitch closed by movement of said cam, and circuit means connecting said second microswitch and said first solenoid to thereby retract said support upon closing of said second microswitch by said cam.

3. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, means for controlling said clutch operatively connected to said microswitch to release said clutch upon closing of said microswitch by a pin engaging said end of said lever, a cam operatively connected with said feed plate, a second microswitch closed by movement of said cam, and circuit means connecting said second microswitch and said solenoid to thereby retract said support upon closing of said second microswitch by said cam.

4. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, means movable into the locus of said pins and overlying said microswitch, means for controlling said clutch operatively connected to said microswitch to release said clutch upon closing of said microswitch by a pin engaging said end of said lever, and means for moving said movable means in timed relationship with said feed plate.

5. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a magazine adapted to hold assembly elements mounted above and to one side of said conveyor, a feed plate mounted for movement across the bottom of said magazine, means for operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, means engageable by each of said pins in turn for closing said microswitch and stopping said conveyor, and means for controlling said clutch operatively connected to said microswitch to release said clutch upon closing of said microswitch, a cam operatively connected with said feed plate, a second microswitch closed by movement of said cam, and circuit means connecting said second microswitch and said solenoid to thereby retract said support upon closing of said second microswitch by said cam.

6. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a magazine adapted to hold assembly elements mounted above and to one side of said conveyor, a feed plate mounted for movement across the bottom of said magazine, means for stopping said conveyor after a predetermined number of clothespins have been positioned opposite said magazine, and means for actuating said feed plate through one cycle to thereby insert an assembly element into the kerfs of said predetermined number of clothespins.

7. A machine for assembling a plurality of kerf-type clothespins on an assembly element comprising an elongate guide, means for moving said clothespins along said guide, an idler roller having a resilient exterior surface, means mounting said idler roller above said guide and with the lowermost part of the exterior surface thereof slightly below the level of the upper surface of kerf-type clothespins mounted on said guide, said guide extending beyond said moving means, a free conveyor comprising a belt having pockets therein for receiving a kerf-type clothes pin in each pocket, said conveyor further comprising a pair of pulleys supporting the upper run of said conveyor in a plane slightly below the extending part of said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, a stop-lever engageable with said clutch for preventing movement of the driven part thereof, a second solenoid for moving said stop-lever out of engagement with the driven part of the clutch, circuit means connecting said microswitch and said second solenoid to release said clutch upon closing of said microswitch by a pin engaging said end of said lever, a cam operatively connected with said feed plate, a second microswitch closed by movement of said cam, and circuit means connecting said second microswitch and said first solenoid to thereby retract said support upon closing of said second microswitch by said cam.

8. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, a stop-lever engageable with said clutch for preventing movement of the driven part thereof, a second solenoid for moving said stop-lever out of engagement with the driven part of the clutch, circuit means connecting said microswitch and said second solenoid to release said clutch upon closing of said microswitch by a pin engaging said end of said lever, a cam operatively connected with said feed plate, a second microswitch closed by movement of said cam, and circuit means connecting said second microswitch and said first solenoid to thereby retract said support upon closing of said second microswitch by said cam.

9. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, means for controlling said clutch operatively connected to said microswitch to release said clutch upon closing of said microswitch by a pin engaging said end of said lever, a cam operatively connected with said feed plate, a second microswitch closed by movement of said cam, and circuit means connecting said second microswitch and said solenoid to thereby retract said support upon closing of said second microswitch by said cam.

10. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a magazine adapted to hold assembly elements mounted above and to one side of said conveyor, a feed plate mounted for moveemnt across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, means movable into the locus of said pins and overlying said micro-switch, means for controlling said clutch operatively connected to said microswitch to release said clutch upon closing of said microswitch, and means for moving said movable means in timed relationship with said feed plate.

11. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a plurality of equally circumferentially spaced pins extending axially from one of said pulleys of said free conveyor, a microswitch mounted adjacent to but spaced from the locus of the free ends of said pins, means engageable by each of said pins in turn for closing said microswitch and stopping said conveyor, and means for controlling said clutch operatively connected to said microswitch to release said clutch upon closing of said microswitch, a cam operatively connected with said feed plate, a second microswitch closed by movement of said cam, and circuit means connecting said second microswitch and said solenoid to thereby retract said support upon closing of said second microswitch by said cam.

12. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a magazine adapted to hold assembly elements mounted above and to one side of said conveyor, said guide having a narrowed section thereof beginning in advance of said magazine, a feed plate mounted for movement across the bottom of said magazine, means for stopping said conveyor after a predetermined number of clothespins have been positioned opposite said magazine, and means for actuating said feed plate through one cycle to thereby insert an assembly element into the kerfs of said predetermined number of clothespins.

13. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a base, a magazine for holding the elements in stacked array on said base, a pair of spaced parallel pusher members, means connected with said clutch for imparting reciprocatory motion to said pusher members, a pair of spacer plates secured in overlying relationship to said pusher members, said spacer plates each having an inwardly directed overhanging shoulder, a support plate extending between said pusher members and slidably received between said pusher members and the overhanging shoulders of said spacer plates, said support plate underlying said magazine in all positions thereof, a feed plate of generally U-shaped plan configuration above said spacer plates having the legs thereof secured to said pusher members and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, a stop-lever engageable with said clutch for preventing movement of the driven part thereof, a second solenoid for moving said stop-lever out of engagement with the driven part of the clutch, circuit means connecting said microswitch and said second solenoid to release said clutch upon closing of said microswitch by a pin engaging said end of said lever, a cam operatively connected with said feeder slide, a second microswitch closed by movement of said cam, and circuit means connecting said second microswitch and said first solenoid to thereby retract said support upon closing of said second microswitch by said cam.

14. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, and a power driven continuously rotating shaft, a clutch mounted on said shaft, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after after forward movement thereof, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, means for controlling said clutch operatively connected to said microswitch to release said clutch upon closing of said microswitch by a pin engaging said end of said lever, a cam operatively connected with said feed plate, a second microswitch closed by movement of said cam, and circuit means connecting said second microswitch and said first solenoid to thereby retract said support upon closing of said second microswitch by said cam.

15. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, a plurality of equally circumferentially spaced pins extending axially from one of said pulleys of said free conveyor, a microswitch mounted adjacent to but spaced from the locus of the free ends of said pins, means movable into the locus of said pins and overlying said microswitch, means for controlling said clutch operatively connected to said microswitch to release said clutch upon closing of said microswitch, and means for moving said movable means in timed relationship with said feed plate.

16. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, means connecting said support and feed plates for lost motion movement therebetween, a plurality of equally circumferentially spaced pins extending axially from one of said pulleys of said free conveyor, a microswitch mounted adjacent to but spaced from the locus of the free ends of said pins, means movable into the locus of said pins and overlying said microswitch, means for controlling said clutch operatively connected to said microswitch to release said clutch upon closing of said microswitch, and means for moving said movable means in timed relationship with said feed plate.

17. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, a plurality of equally circumferentially spaced pins extending axially from one of said pulleys of said free conveyor, a microswitch mounted adjacent to but spaced from the locus of the free ends of said pins, means engageable by each of said pins in turn for closing said microswitch and stopping said conveyor, and means for controlling said clutch operatively connected to said microswitch to release said clutch upon closing of said microswitch, a cam operatively connected with said feed plate, a second microswitch closed by movement of said cam, and circuit means connecting said second microswitch and said solenoid to thereby retract said support upon closing of said second microswitch by said cam.

18. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, means connecting said support and feed plates for lost motion movement therebetween, a plurality of equally circumferentially spaced pins extending axially from one of said pulleys of said free conveyor, a microswitch mounted adjacent to but spaced from the locus of the free ends of said pins, means engageable by each of said pins in turn for closing said microswitch and stopping said conveyor, and means for controlling said clutch operatively connected to said microswitch to release said clutch upon closing of said microswitch, a cam operatively connected with said feed plate, a second microswitch closed by movement of said cam, and circuit means connecting said second microswitch and said solenoid to thereby retract said support upon closing of said second microswitch by said cam.

19. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, and means for stopping said conveyor after a predetermined number of clothespins have been positioned opposite said magazine.

20. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plates secured to said pusher means and having a side thereof positioned for movement beneath said magazine, means slidably mounting said feed plate in said base, means connecting said support and feed plates for lost motion movement therebetween, and means for stopping said conveyor after a predetermined number of clothespins have been positioned opposite said magazine.

21. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, a stop-lever engageable with said clutch for preventing movement of the driven part thereof, a second solenoid for moving said stop-lever out of engagement with the driven part of the clutch, circuit means connecting said microswitch and said second solenoid to release said clutch upon closing of said microswitch by a pin engaging said end of said lever, a cam operatively connected with said feed plate, a second microswitch closed by movement of said cam, and circuit means connecting said second microswitch and said first solenoid to thereby retract said support upon closing of said second microswitch by said cam.

22. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, means connecting said support and feed plates for lost motion movement therebetween, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, a stop-lever engageable with said clutch for preventing movement of the driven part thereof, a second solenoid for moving said stop-lever out of engagement with the driven part of the clutch, circuit means connecting said microswitch and said second solenoid to release said clutch upon closing of said microswitch by a pin engaging said end of said lever, a cam operatively connected with said feed plate, a second microswitch closed by movement of said cam, and circuit means connecting said second microswitch and said first solenoid to thereby retract said support upon closing of said second microswitch by said cam.

23. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a base adjacent said conveyor, a magazine for holding the elements in stacked aray on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, means for controlling said clutch operatively connected to said microswitch to release said clutch upon closing of said microswitch by a pin engaging said end of said lever, a cam operatively connected with said feed plate, a second microswitch closed by movement of said cam, and circuit means connecting said second microswitch and said solenoid to thereby retract said support upon closing of said second microswitch by said cam.

24. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a base adjacent said conveyor, a magazine for holding the elements in stacked array on said base, pusher means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, means connecting said support and feed plates for lost motion movement therebetween, a plurality of equally circumferentially spaced pins extending axially from one of said pulleys of said free conveyor, a microswitch mounted adjacent to but spaced from the locus of the free ends of said pins, a support slidable towards and away from said one pulley, a solenoid for moving said support away from said one pulley, a lever pivoted on said support having an end thereof in the locus of said pins in the forward position thereof, said lever overlying said microswitch, means for controlling said clutch operatively connected to said microswitch to release said clutch upon closing of said microswitch by a pin engaging said end of said lever, a cam operatively connected with said feed plate, a second microswitch closed by movement of said cam, and circuit means connecting said second microswitch and said solenoid to thereby retract said support upon closing of said second microswitch by said cam.

25. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, a plurality of equally circumferentially spaced pins extending axially from one of said pulleys of said free conveyor, a microswitch mounted adjacent to but spaced from the locus of the free ends of said pins, means movable into the locus of said pins and overlying said microswitch, means for controlling said clutch operatively connected to said microswitch to release said clutch upon closing of said microswitch, and means for moving said movable means in timed relationship with said feed plate.

26. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, means connecting said support and feed plates for lost motion movement therebetween, a plurality of equally circumferentially spaced pins extending axially from one of said pulleys of said free conveyor, a microswitch mounted adjacent to but spaced from the locus of the free ends of said pins, means movable into the locus of said pins and overlying said microswitch, means for controlling said clutch operatively connected to said microswitch to release said clutch upon closing of said microswitch, and means for moving said movable means in timed relationship with said feed plate.

27. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, a plurality of equally circumferentially spaced pins extending axially from one of said pulleys of said free conveyor, a microswitch mounted adjacent to but spaced from the locus of the free ends of said pins, means engageable by each of said pins in turn for closing said microswitch and stopping said conveyor, and means for controlling said clutch operatively connected to said microswitch to release said clutch upon closing of said microswitch, a cam operatively connected with said feed plate, a second microswitch closed by movement of said cam, and circuit means connecting said second microswitch and said solenoid to thereby retract said support upon closing of said second microswitch by said cam.

28. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a clutch mounted on said shaft, a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, means connecting said support and feed plates for lost motion movement therebetween, a plurality of equally circumferentially spaced pins extending axially from one of said pulleys of said free conveyor, a microswitch mounted adjacent to but spaced from the locus of the free ends of said pins, means engageable by each of said pins in turn for closing said microswitch and stopping said conveyor, and means for controlling said clutch operatively connected to said microswitch to release said clutch upon closing of said microswitch, a cam operatively connected with said feed plate, a second microswitch closed by movement of said cam, and circuit means connecting said second microswitch and said solenoid to thereby retract said support upon closing of said second microswitch by said cam.

29. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, a stop engageable by said second bar after forward movement thereof, and means for stopping said conveyor after a predetermined number of clothespins have been positioned opposite said magazine.

30. A machine for assembling a plurality of kerf-type clothespins on an assembly element comprising an elongate guide, means for moving clothespins along said guide in contiguous relationship, a free conveyor comprising a belt having pockets therein for receiving a kerf-type clothespin in each pocket, said conveyor further comprising a pair of pulleys supporting the upper run of said conveyor in a plane slightly below said guide, a power driven continuously rotating shaft, a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, means connecting said support and feed plates for lost motion movement therebetween, and means for stopping said conveyor after a predetermined number of clothespins have been positioned opposite said magazine.

31. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, a magazine adapted to hold assembly elements mounted above and to one side of said conveyor, a feed plate mounted for movement across the bottom of said magazine, means operatively connecting said feed plate and said clutch for movement of said plate from said clutch, a first microswitch mounted in juxtaposition with said guide to sense clothespins thereon a predetermined distance in advance of said roller, a second microswitch mounted in juxtaposition with said feeder means to sense the rear position thereof, a plurality of equally circumferentially spaced pins extending axially from one pulley of said conveyor, a solenoid actuated stop engageable by each of said pins in the non-energized state of said solenoid, said solenoid being in series with said switches whereby to withdraw said stop upon closing of said switches, a stop-lever engageable with said clutch for preventing movement of the driven part thereof, a second solenoid for moving said lever out of engagement with the driven part of the clutch, a cam operatively connected with said one pulley, a third microswitch closed by movement of said cam, and circuit means connecting said third microswitch and said second solenoid to thereby retract said stop-lever upon closing of said third microswitch by said cam.

32. The apparatus of claim 31, and further including a fourth microswitch in advance of said first microswitch and in series therewith, said first and fourth microswitches each being movable to fourth position only upon engagement therewith of two contiguous clothespins.

33. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, feeder means for feeding assembly elements into the kerfs of clothespins on said guide, a first microswitch mounted in juxtaposition with said guide to sense clothespins thereon a predetermined distance in advance of said roller, a second microswitch mounted in juxtaposition with said feeder means to sense the rear position thereof, a plurality of equally circumferentially spaced pins extending axially from one pulley of said conveyor, a solenoid actuated stop engageable by each of said pins in the non-energized state of said solenoid, said solenoid being in series with said switches whereby to withdraw said stop upon closing of said switches, and means responsive to the position of said pulley for effecting a single revolution of said clutch.

34. The apparatus of claim 33, said feeder means comprising a base adjacent said conveyor, a magazine for holding the elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, and a stop engageable by said second bar after forward movement thereof.

35. The apparatus of claim 33, said feeder means comprising a base adjacent said conveyor, a magazine for holding the elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, and means connecting said support and feed plates for lost motion movement therebetween.

36. A machine for assembling a plurality of kerf-type clothespins on an assembly element comprising an elongate guide, an endless belt trained over spaced pulleys, the upper run of said belt lying in a plane slightly below said guide, means for rotating one of said pulleys, an idler roller having a resilient exterior surface, means mounting said idler roller above said one pulley and with the lowermost part of the exterior surface thereof slightly below the level of the upper surface of kerf-type clothespins mounted on said guide, said guide extending beyond said belt, a free conveyor comprising a belt having pockets therein for receiving a kerf-type clothespin in each pocket, said conveyor further comprising a pair of pulleys supporting the upper run of said conveyor in a plane slightly below the extending part of said guide, a power driven continuously rotating shaft, a clutch mounted on said shaft, feeder means for feeding assembly elements into the kerfs of clothespins on said guide, means for stopping said conveyor, means responsive to the position said feeder means and to the number of clothespins on said guide for controlling said stop means, and means responsive to the position of said pulley for effecting a single revolution of said clutch.

37. The apparatus of claim 36, said feeder means comprising a base adjacent said conveyor, a magazine for holding assembly elements in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, and a stop engageable by said second bar after forward movement thereof.

38. The apparatus of claim 36, said feeder means comprising a base adjacent said conveyor, a magazine for holding assembly elements in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, and means connecting said support and feed plates for lost motion movement therebetween.

39. Mechanism for feeding articles comprising a base, a magazine for holding the articles in stacked array on said base, a pair of spaced parallel pusher members, means for imparting reciprocatory motion to said pusher members, a pair of spacer plates secured in overlying relationship to said pusher members, said spacer plates each having an inwardly directed overhanging shoulder, a support plate extending between said pusher members and slidably received between said pusher members and the overhanging shoulders of said spacer plates, said support plate underlying said magazine in all positions thereof, a feed plate of generally U-shaped plan configuration above said spacer plates having the legs thereof secured to said pusher members and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, and a stop engageable by said second bar after forward movement thereof.

40. Mechanism for feeding articles comprising a base, a magazine for holding the articles in stacked array on said base, a pair of spaced parallel pusher members, means for imparting reciprocatory motion to said pusher members, a support plate extending between said pusher members and slidably received thereon, said support plate underlying said magazine in all positions thereof, a feed plate of generally U-shaped plan configuration above said support plate having the legs thereof secured to said pusher elements and the bight thereof positioned for movement beneath said magazine, means slidably mounting said legs in said base, a bar connected to said pusher members and extending therebetween, a second bar underlying and connected to said support plate, a guide rod secured to said second bar and slidably received in said first bar, a spring surrounding said rod and extending between said bars, and a stop engageable by said second bar after forward movement thereof.

41. Mechanism for feeding articles comprising a base, a magazine for holding the articles in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, a bar connected to said pusher means and extending transversely thereof, a second bar underlying and connected to said support plate, a guide rod secured to said second bar and slidably received in said first bar, a spring surrounding said rod and extending between said bars, nad a stop engageable by said second bar after forward movement thereof.

42. Mechanism for feeding articles comprising a base, a magazine for holding the articles in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, a bar connected to said pusher means and extending transversely thereof, a second bar underlying and connected to said support plate, and means connecting said bars for lost motion movement therebetween.

43. Mechanism for feeding articles comprising a base, a magazine for holding the articles in stacked array on said base, pusher means, means for imparting reciprocatory motion to said pusher means, a support plate slidable on said pusher means, said support plate underlying said magazine in all positions thereof, a feed plate above said support plate secured to said pusher means and having a side thereof positioned for movement beneath said magazine, means slidably mounting said feed plate in said base, and means connecting said support and feed plates for lost motion movement therebetween.

44. A machine for assembling a plurality of kerf-type clothespins on an assembly element comprising an elongate guide, means for moving clothespins along said guide, an endless free running conveyor having contiguous pockets therein for receiving clothespins, means for progressing said conveyor by collecting clothespins and urging them along said guide closely overlying a part of the upper run of said conveyor and into the pockets of said conveyor while maintaining the clothespin kerfs in the same orientation, means for stopping said conveyor after a predetermined number of clothespins are positioned, and means for inserting an assembly element into the kerfs of the predetermined number of clothespins while the clothespins are in the pockets of the conveyor.

45. A machine for assembling a plurality of kerf-type clothespins on an assembly element comprising an elongate guide having kerf-type clothespins inserted thereon and all oriented in the same direction, means for moving clothespins along said guide at random intervals, free running conveyor means having pockets therein to receive said clothespins, means for delivering clothespins in contiguous relationship from said guide to said pockets of said conveyor means, and for progressing said conveyor means, and means for inserting an assembly element into said kerfs while the clothespins are in the pockets of said conveyor means.

46. A machine for assembling a plurality of kerf-type clothespins on an assembly element comprising an elongate guide, means for moving kerf-type clothespins along a first part of said guide, free running conveyor means having pockets therein to receive the clothespins, said conveyor means underlying a second part of said guide, with the second part of said guide extending above a first part of the upper run of said conveyor, means for progressing said conveyor means by collecting clothespins and urging them along the second part of said guide into the pockets of said conveyor, and means for inserting an assembly element into the kerfs while the clothespins are in the pockets of said conveyor means.

47. A machine for assembling a plurality of kerf-type clothespins on an assembly element comprising an elongate guide having kerf-type clothespins inserted thereon and all oriented in the same direction, means for moving clothespins along said guide at random intervals, free running conveyor means having pockets therein to receive said clothespins, means for delivering clothespins in contiguous relationship from said guide to said pockets of said conveyor means comprising an idler roller having a resilient exterior surface mounted with the lowermost part of the exterior surface slightly below the level of the upper surface of the kerf-type clothespins mounted on said guide for progressing said conveyor means by collecting clothespins and urging them along said guide closely overlying a part of the upper run of said conveyor means and into the pockets of said conveyor, and means for inserting an assembly element into the kerfs of the clothespins while the clothespins are in the pockets of said conveyor means.

48. A machine for assembling a plurality of kerf-type clothespins on an assembly element comprising an elongated guide, means for moving clothespins along said guide in contiguous relationship, an endless free running conveyor having contiguous pockets therein for receiving the clothespins, means for progressing said conveyor means by collecting clothespins and urging them along said guide closely overlying a part of the upper run of said conveyor means and into the pockets of said conveyor while maintaining the clothespin kerfs in the same orientation, a feed plate mounted for reciprocating movement, means for stopping said conveyor after a predetermined number of clothespins are positioned, and means for actuating said feed plate through one cycle to thereby insert an assembly element into the kerfs of the predetermined number of clothespins.

49. A machine for assembling a plurality of kerf-type clothespins on an assembly element comprising an elongated guide, a freely running endless conveyor having contiguous pockets therein for receiving the clothespins, means for moving clothespins along said guide in contiguous relationship, and for progressing said conveyor by collecting the clothespins and urging them along said guide to said conveyor pockets while maintaining the clothespin kerfs in the same orientation, a magazine adapted to hold assembly elements mounted to one side of said conveyor, said guide having a narrowed section thereof beginning in advance of said magazine, and means for inserting an assembly element into the clothespin kerfs while the clothespins are in the pockets of said conveyor.

References Cited in the file of this patent

UNITED STATES PATENTS

| | | |
|---|---|---|
| 2,599,547 | Feyrer | June 10, 1952 |
| 2,760,318 | Brenneck et al. | Aug. 28, 1956 |
| 2,771,206 | Daniels et al. | Nov. 20, 1956 |
| 2,843,254 | Vaughan | July 29, 1957 |
| 2,860,465 | Wolter | Nov. 18, 1958 |